US009900753B2

(12) United States Patent
Zhou (10) Patent No.: US 9,900,753 B2
(45) Date of Patent: Feb. 20, 2018

(54) WEARABLE DEVICE AND ASSOCIATED METHOD OF CREATING A COMMUNICATION GROUP BASED ON WEARABLE DEVICES (71) Applicant: JRD COMMUNICATION INC., Shenzhen, Guangdong (CN)

(72) Inventor: Libin Zhou, Guangdong (CN)

(73) Assignee: JRD COMMUNICATION INC., Shenzhen, Guangdong Province (CN)

( * ) Notice: Subject to any disclaimer, the term of this patent is extended or adjusted under 35 U.S.C. 154(b) by 0 days.

(21) Appl. No.: 15/104,231

(22) PCT Filed: Jul. 6, 2015

(86) PCT No.: PCT/CN2015/083370
§ 371 (c)(1),
(2) Date: Jun. 13, 2016

(87) PCT Pub. No.: WO2016/150027
PCT Pub. Date: Sep. 29, 2016

(65) Prior Publication Data
US 2017/0127250 A1 May 4, 2017

(30) Foreign Application Priority Data
Mar. 25, 2015 (CN) .......................... 2015 1 0133041

(51) Int. Cl.
*H04B 7/00* (2006.01)
*H04W 4/08* (2009.01)
*H04W 4/02* (2018.01)

(52) U.S. Cl.
CPC ............. *H04W 4/08* (2013.01); *H04W 4/023* (2013.01)

(58) Field of Classification Search
CPC ........ G06F 1/163; G06Q 20/325; G09G 3/20; H04B 1/385; H04B 2001/3861;
(Continued)

(56) References Cited

U.S. PATENT DOCUMENTS

2001/0049471 A1* 12/2001 Suzuki ................. A61B 5/0002
600/300
2008/0055395 A1* 3/2008 Mock .................. G06Q 20/3224
348/14.01
(Continued)

FOREIGN PATENT DOCUMENTS

CN 103475754 A 12/2013
CN 103490990 A 1/2014
(Continued)

OTHER PUBLICATIONS

International Search Report on related PCT application (PCT/CN2015/083370) from International Searching Authority (CN) dated Dec. 25, 2015.

*Primary Examiner* — Tan H Trinh
(74) *Attorney, Agent, or Firm* — Cheng-Ju Chiang (57) ABSTRACT A method of creating a communication group based on wearable devices, and such a wearable device are disclosed. The method includes: acquiring the position information of the current wearable device and of the nearby wearable devices; calculating the distances of these nearby wearable devices from the current wearable device based on the position information; building up, by the current wearable device, communication connections with the nearby wearable devices that satisfy the preset conditions and thus creating the communication group. According to the disclosure, the current wearable device can automatically build up a communication group with the nearby wearable devices
(Continued)

that satisfy the preset distance requirements, such that a user can expand his friendship circle.

11 Claims, 3 Drawing Sheets

(58) Field of Classification Search
CPC ........ H04M 1/05; H04M 1/57; H04M 1/7253; H04M 2250/12; H04M 2250/22
USPC .......... 455/41.1, 41.2, 518, 519, 416, 404.2, 455/90.2, 414.1, 456.2, 9, 67.11, 552.1, 455/115.1, 513, 135; 709/211; 715/753; 434/362; 340/10.1, 539.12, 870.07, 340/932.2; 705/39; 700/17.13
See application file for complete search history.

(56) References Cited

U.S. PATENT DOCUMENTS

| | | | |
|---|---|---|---|
| 2009/0019113 A1* | 1/2009 | Wu | H04L 12/1881 709/204 |
| 2009/0058611 A1* | 3/2009 | Kawamura | H04N 7/185 340/10.1 |
| 2009/0156162 A1* | 6/2009 | Satou | H04L 12/1818 455/406 |
| 2009/0186605 A1* | 7/2009 | Apfel | G06F 3/0486 455/416 |
| 2012/0290950 A1* | 11/2012 | Rapaport | H04L 51/32 715/753 |
| 2013/0262298 A1* | 10/2013 | Morley | H04M 1/05 705/39 |
| 2014/0330585 A1* | 11/2014 | Martinez | G06F 19/322 705/3 |
| 2015/0052221 A1* | 2/2015 | Yoon | H04W 4/008 709/217 |
| 2015/0120000 A1* | 4/2015 | Coffey | H04L 12/2803 700/13 |
| 2015/0130355 A1* | 5/2015 | Rains, Jr. | H05B 37/0227 315/134 |
| 2015/0153571 A1* | 6/2015 | Ballard | G02B 27/017 345/8 |
| 2015/0170504 A1* | 6/2015 | Jooste | A61B 5/6898 340/539.12 |
| 2015/0206440 A1* | 7/2015 | Aylesworth | G09B 5/00 434/362 |
| 2015/0237190 A1* | 8/2015 | Yeon | H04M 1/72522 715/753 |
| 2016/0039424 A1* | 2/2016 | Hong | B60W 40/08 701/2 |
| 2016/0046285 A1* | 2/2016 | Kim | G08G 1/133 340/932.2 |
| 2016/0080550 A1* | 3/2016 | Kwon | H04M 1/72538 455/404.2 |
| 2016/0132046 A1* | 5/2016 | Beoughter | G06F 17/30554 700/17 |
| 2016/0143532 A1* | 5/2016 | Lee | A61B 5/7445 340/870.07 |
| 2016/0255068 A1* | 9/2016 | Pritchard | G06F 21/35 726/7 |
| 2016/0269878 A1* | 9/2016 | Miller | H04M 1/6041 |
| 2016/0358225 A1* | 12/2016 | Zhang | G06F 17/30256 |
| 2017/0011210 A1* | 1/2017 | Cheong | H04W 12/06 |
| 2017/0032692 A1* | 2/2017 | Choi | H04W 4/02 |
| 2017/0034688 A1* | 2/2017 | Kim | H04W 4/02 |
| 2017/0164164 A1* | 6/2017 | Apfel | H04W 4/08 |

FOREIGN PATENT DOCUMENTS

| | | |
|---|---|---|
| CN | 104205785 A | 12/2014 |
| CN | 104320163 A | 1/2015 |

* cited by examiner

WEARABLE DEVICE AND ASSOCIATED METHOD OF CREATING A COMMUNICATION GROUP BASED ON WEARABLE DEVICES

FIELD OF THE DISCLOSURE

The present disclosure relates to communication technologies, and more particularly, to a method of creating a communication group based on wearable devices, and a wearable device.

BACKGROUND OF THE DISCLOSURE

Wearable devices are becoming increasingly popular. However, a wearable device usually offers a small size screen, which is very difficult to manipulate, especially when making inputs into the wearable device. In addition, the applications available for wearable devices are very limited, and thus cannot satisfy the needs of users.

SUMMARY OF THE DISCLOSURE

A method of creating a communication group based on wearable devices, as well as a wearable device, is provided by the disclosure. According to the disclosure, the current wearable device can automatically create a communication group with the nearby wearable devices that satisfy the preset conditions, such that the user of the current wearable device can make friends with the owners of other wearable devices in order to expand his friendship circle.

To achieve the above objective, one technical solution adopted by the disclosure is to provide a method of creating a communication group based on wearable devices. The method includes: receiving, by a current wearable device, the setting information entered by the user-including hobby settings; receiving, by the current wearable device, the global positioning system (GPS) position information of the current wearable device and of the nearby wearable devices, or receiving the wireless signals emitted from the nearby wearable devices and thus measuring the corresponding signal strength values of these wireless signals; calculating, by the current wearable device, the distances from these nearby wearable devices from the current wearable device based on the GPS position information or the signal strength; and building up, by the current wearable device, communication connections with the nearby wearable devices that satisfy the preset distance requirements, and thus creating a communication group.

The step of building up, by the current wearable device, the communication connections with the nearby wearable devices to create a communication group may include: building up, by the current wearable device, the communication connections with the nearby wearable devices that satisfy the preset distance requirements and share common hobby settings, found in the setting information, as the current wearable device, and thus creating the communication group.

The preset distance requirements may include that the distance of a nearby wearable device from the current wearable device is smaller than a preset threshold value or is within a preset value range.

To achieve the above objective, another technical solution adopted by the disclosure is to provide a method of creating a communication group based on wearable devices. The method includes: acquiring, by the current wearable device, the position information of the current wearable device and of the nearby wearable devices; calculating, by the current wearable device, the distances of these nearby wearable devices from the current wearable device based on the position information; and building up, by the current wearable device, communication connections with the nearby wearable devices that satisfy the preset distance requirements, in order to create a communication group.

The step of acquiring the position information of the current wearable device and of the nearby wearable devices may include: acquiring, by the current wearable device, the GPS position information of the current wearable device and of the nearby wearable devices, or receiving the wireless signals emitted from the nearby wearable devices and measuring the corresponding signal strength values of these wireless signals.

The step of calculating, by the current wearable device, the distances of these nearby wearable devices from the current wearable device based on the position information may include: calculating the distances of these nearby wearable devices from the current wearable device based on the GPS position information or the signal strength values.

The method may further include, before the step of acquiring, by the current wearable device, the position information of the current wearable device and of the nearby wearable devices: receiving the setting information entered by the user-including the hobby settings.

The method may further include, before the step of acquiring, by the current wearable device, the position information of the current wearable device and of the nearby wearable devices: receiving the setting information entered by the user-including the hobby settings.

The method may further include, before the step of acquiring, by the current wearable device, the position information of the current wearable device and of the nearby wearable devices: receiving the setting information entered by the user-including the hobby settings.

The step of building up, by the current wearable device, the communication connections with the nearby wearable devices to create a communication group may include: building up, by the current wearable device, the communication connections with the nearby wearable devices that satisfy the preset distance requirements and share common hobby settings, found in the setting information, as the current wearable device, and thus creating the communication group.

To achieve the above objective, yet another technical solution adopted by the disclosure is to provide a wearable device which can create a communication group with other such wearable devices. The wearable device includes: an acquisition module configured to obtain the position information of the current wearable device and of the nearby wearable devices; a computation module configured to calculate the distances of these nearby wearable devices from the current wearable device based on the position information; and a grouping module configured to build up communication connections with the nearby wearable devices that satisfy the preset distance requirements, and thus to create a communication group.

The acquisition module may specifically obtain the GPS position information of the current wearable device and of the nearby wearable devices, or receive the wireless signals emitted from the nearby wearable devices and further measure the corresponding signal strength values of these wireless signals.

The computation module may specifically calculate the distances of these nearby wearable devices from the current wearable device based on the GPS position information or the signal strength values.

The wearable device may further include a configuration module configured to receive the setting information entered by the user-including the hobby settings.

The wearable device may further include a configuration module configured to receive the setting information entered by the user-including the hobby settings.

The wearable device may further include a configuration module configured to receive the setting information entered by the user-including the hobby settings.

The grouping module may specifically build up the communication connections with the nearby wearable devices that satisfy the preset distance requirements and share common hobby settings, found in the setting information, as the current wearable device, and thus create the communication group.

Advantages of the disclosure may follow: differing from the prior art, the current wearable device acquires the position information of itself and of the nearby wearable devices, calculates the distances of these nearby wearable devices from the current wearable device based on the position information, and builds up communication connections with the nearby wearable devices that satisfy the preset distance requirements, thus a communication group can be automatically created, such that the user of the current wearable device can expand his friendship circle.

DETAILED DESCRIPTION OF THE DISCLOSURE

For a thorough understanding of the disclosure, numerous specific details are set forth in the following description for purposes of illustration but not of limitation, such as system architectures, interfaces and relevant technologies, etc. However, it should be appreciated by those of skill in the art that, in absence of these specific details, the disclosure may also be achieved by other implementations. In other instances, a detailed description for well-known devices, circuits and methods is omitted, in order to avoid unnecessary details from hindering the description of the disclosure.

Figure 1:
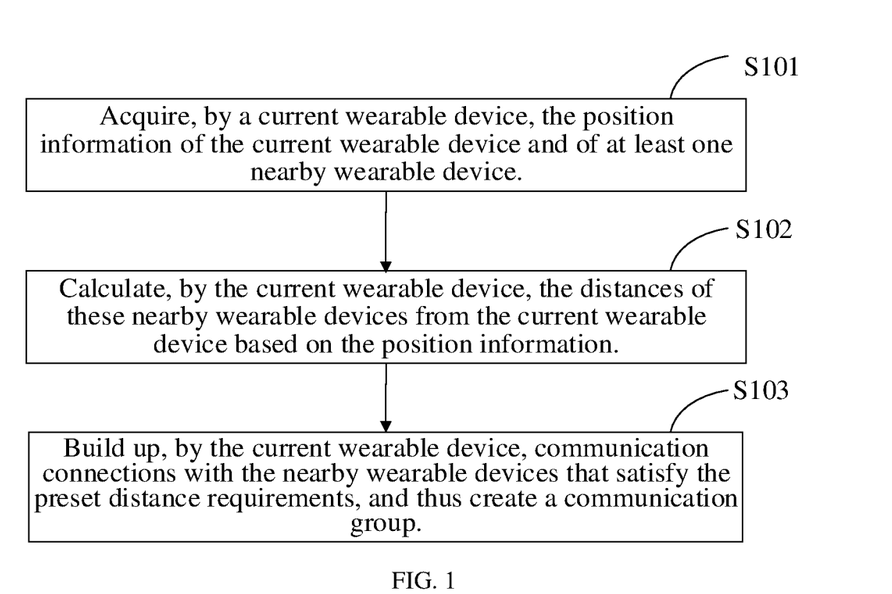
FIG. 1 is a flow chart illustrating a method of creating a communication group based on wearable devices according to an embodiment of the disclosure.

Referring to FIG. 1, a flow chart illustrating a method of creating a communication group based on wearable devices is shown. The wearable devices can be, for example, but not limited to, smartwatches. Every wearable device may have a touch screen, and can recognize the gestures inputted on the touch screen. The method may include the following steps.

In a first step S101, the current wearable device acquires the position information of itself and of the nearby wearable devices.

Typically, when the current wearable device is working properly, it may keep trying to obtain its own position information and the position information of the wearable devices in the vicinity. It may obtain the position information provided by the positioning of the global positioning system (GPS), or by receiving the wireless signals transmitted from the surrounding wearable devices and thus measuring the corresponding signal strength values of these wireless signals. However, the position information can also be acquired by other means, which are not limited herein. The wireless signals can be, for example, Bluetooth signals or WiFi signals. The method may proceed to step S102.

In the following step S102, the current wearable device calculates the distance of the nearby wearable devices from the current wearable device based on the acquired position information.

When the current wearable device has acquired the position information, either by GPS positioning or by receiving the wireless signals, of the current wearable device and of the nearby wearable devices, the current wearable device can then calculate the distance of each nearby wearable device from the current wearable device. The method may continue to step S103.

In the following step S103, the current wearable device builds up communication connections with the nearby wearable devices that satisfy the preset distance requirements and thus creates a communication group.

The wearable device may determine, for each nearby wearable device, whether its distance from the current wearable device satisfies the preset distance requirements. As a result, the current wearable device may sort out all the nearby wearable devices that satisfy the preset distance requirements, and build up communication connections with them and thus creates a communication group. All the members within the communication group can communicate with each other.

The preset distance requirements can be, for example, that the distance of a nearby wearable device from the current wearable device is smaller than a preset threshold value such as 10 meters, or is within a preset value range such as 0 to 20 meters. The preset threshold value and the preset value range are not limited thereto, and can also be any other values. Furthermore, the preset distance requirements are not limited to the above mentioned, and can also be other conditions based on specific requirements.

It should be appreciated that, when the communication group has been created, and the current wearable device detects the distance of any nearby wearable device from itself no longer satisfies the preset requirements, i.e., the nearby wearable device is leaving from the current wearable device so that the distance is increasing until it is larger than the preset threshold value or it exceeds the preset value range, then the nearby wearable device will be automatically pulled out from the communication group, and all the information related to this nearby wearable device will also be wiped out, such that the personal information of the user of this wearable device will not be leaked and thus his privacy can be well protected.

It should also be noted that, when a user of a member wearable device in the communication group is a vendor, he then can automatically push to the communication group his new product information, promotion information, and so on. Thus, the users of the other member wearable devices can keep abreast with the relevant information.

Advantages of the disclosure may follow: differing from the prior art, the current wearable device acquires the position information of itself and of the nearby wearable devices, calculates the distances of these nearby wearable devices from the current wearable device based on the position information, and builds up communication connections with the nearby wearable devices that satisfy the preset distance requirements, thus a communication group can be automatically created, such that the user of the current wearable device can expand his friendship circle.

Figure 2:
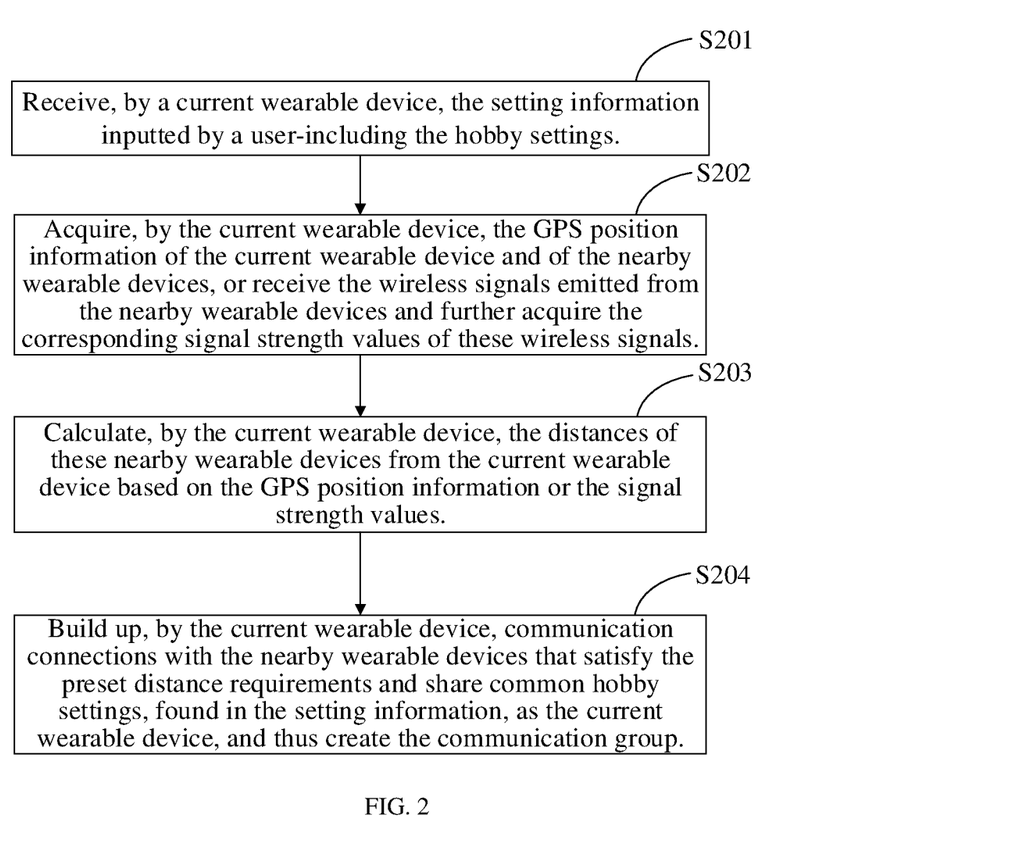
FIG. 2 is a flow chart illustrating a method of creating a communication group based on wearable devices according to another embodiment of the disclosure.

Referring now to FIG. 2, a flow chart illustrating another method of creating a communication group based on wearable devices is shown. The wearable devices can be, for example, but not limited to, smartwatches. Every wearable device may have a touch screen, and can recognize the gestures inputted on the touch screen. The method may include the following steps.

In a first step S201, the wearable device receives the setting information entered by the user-including the hobby settings.

When the current wearable device is working properly, the user can configure the settings in a configuration interface. For example, the user can select or enter his hobbies in the configuration interface. The current wearable device can receive the corresponding setting information, which may include the user's interests and hobbies, such as traveling, photography, etc. The settings may be chosen from existing options present in the configuration interface, and can also be entered through the touch screen. However, the settings can be configured through other means, which are not limited herein. The method may continue to a following step S202.

In the step S202, the current wearable device acquires the global positioning system (GPS) position information of itself and of the nearby wearable devices, or receives the wireless signals emitted from the nearby wearable devices and further measures the signal strength values corresponding to the wireless signals.

After the current wearable device receives the setting information from the user, it will automatically search for GPS signals, Bluetooth signals and WiFi signals.

If the wearable device can detect a GPS signal, it can be positioned by the GPS. Furthermore, the current wearable device can acquire the position information of the nearby wearable devices which is also provided by the GPS.

If the current wearable device can detect a Bluetooth signal or a WiFi signal from a nearby wearable device, it may establish a communication connection with the nearby wearable device and receive wireless signals from the nearby wearable device and further measures the corresponding signal strength of these wireless signals, which is known as the received signal strength indication (RSSI). The method may then proceed to step S203.

In the following step S203, the current wearable device calculates the distances of the nearby wearable devices from the current wearable device based on the acquired position information or the measured signal strength values.

In the case the current wearable device acquires the position information by GPS positioning, it can directly calculate the distances of the nearby wearable devices from the current wearable device based on the GPS position information.

In the case the current wearable device measures the RSSI values of the Bluetooth signals or WiFi signals emitted by the respective nearby wearable devices, it can retrieve in a lookup table the distances corresponding to the acquired RSSI values, and the distances can be taken as those of the nearby wearable devices from the current wearable device.

In the lookup table, one RSSI value can correspond to exactly one distance, or one RSSI within a preset range corresponds to one distance. The correspondences between the RSSI values and the distances can also be configured based on practical requirements, and are thus not limited herein.

Below the correspondences will be illustrated based on the case where one RSSI value within a preset range corresponds to exactly one distance. It should however be noted that the preset ranges or distances are not limited to those described, and can also be any other ranges or distances, which are not limited herein.

For example, when $-100\ dbm \leq RSSI \leq -98\ dbm$, the corresponding distance is 15 meters; when $-98\ dbm < RSSI \leq -95\ dbm$, the corresponding distance is 12 meters; when $-95\ dbm \leq RSSI \leq -90\ dbm$, the corresponding distance is 10 meters; when $-90\ dbm \leq RSSI \leq -85\ dbm$, the corresponding distance is 6 meters; when $-85\ dbm < RSSI \leq -80\ dbm$, the corresponding distance is 2 meters; and when $-80\ dbm \leq RSSI < -75\ dbm$, the corresponding distance is 1 meter.

The current wearable device can determine the corresponding preset range of the RSSI value of the wireless signals received from each wearable device, and thus retrieves the distance corresponding to the preset range. The method can then proceed to step S204.

In the step S204, the current wearable device builds up communication connections with the nearby wearable devices that satisfy the preset distance requirements and share common hobby settings as the current wearable device, such that a communication group is created among them.

The wearable device may determine, for each nearby wearable device, whether its distance from the current wearable device satisfies the preset distance requirements.

When the current wearable device determines that a nearby wearable device satisfies the preset distance requirements, it may proceed to acquire the hobby settings of this nearby wearable device that is contained in the setting information, and determine whether the nearby wearable device contains the common hobby settings as the current wearable device. If it contains common hobby settings, the current wearable device would establish a communication connection with this nearby wearable device. As a result, a communication group can be created between the current wearable device and the nearby wearable device that satisfy the preset distance requirements and share common hobby settings as the current wearable device. Thus, the users who share common hobbies can communicate with each other.

The preset distance requirements can be, for example, that the distance of a nearby wearable device from the current wearable device is smaller than a preset threshold value, or is within a preset value range. The preset threshold value and the preset value range are not limited, and can also be any other values. Furthermore, the preset distance requirements are not limited the above mentioned, and can also be other conditions based on specific requirements.

It should be appreciated that, when the communication group has been created, and the current wearable device detects the distance of any nearby wearable device from itself no longer satisfies the preset requirements, i.e., the nearby wearable device is leaving from the current wearable device so that the distance is increasing until it is larger than the preset threshold value or it exceeds the preset value range, then this nearby wearable device will be automatically pulled out from the communication group, and all the information related to this nearby wearable device will also be wiped out, such that the personal information of the user of this nearby wearable device will not be leaked and his privacy can be well protected.

It should also be noted that, when a user of a member wearable device in the communication group is a vendor, he can automatically push his new product information, promotion information, etc. to the other member wearable devices within the communication group based on their respective hobby settings. Thus, the users of the other member wearable devices can keep abreast with the relevant information.

For example, when the user of the current wearable device is a vendor, he can enter a public domain, such as a cinema or a shopping mall, and his wearable device can then automatically acquire its own position information, the position information and the hobby settings of the nearby wearable devices, and calculate the distances of these nearby wearable devices from the current wearable device based on the position information. As a result, a communication group is automatically created which includes the current wearable device and the nearby wearable devices that satisfy the preset distance requirements and share common hobby settings as the current wearable device. When the user of a nearby wearable device leaves from the current wearable device, for example, departing from the cinema or shopping mall, this nearby wearable device will be automatically pulled out from the communication group.

Advantages of the disclosure may follow: differing from the prior art, the current wearable device acquires the position information of itself and of the nearby wearable devices, calculates the distances of these nearby wearable devices from the current wearable device based on the position information, and builds up communication connections with the nearby wearable devices that satisfy the preset distance requirements, thus a communication group can be automatically created, such that the user of the current wearable device can expand his friendship circle, and can communicate with the other users who share common hobbies.

Figure 3:
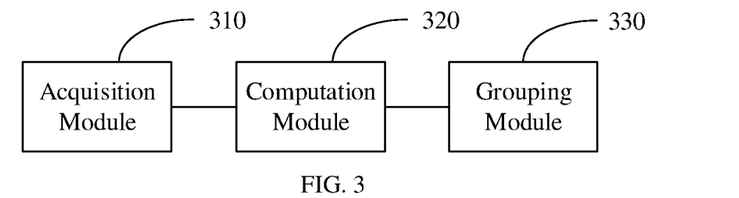
FIG. 3 is a block diagram illustrating a wearable device which can create a communication group with other such wearable devices according to an embodiment of the disclosure.

Referring now to FIG. 3, a block diagram illustrating a wearable device which can create a communication group with other such wearable devices according to an embodiment is shown. The wearable devices can be, for example, but not limited to, smartwatches. Every wearable device may have a touch screen, and can recognize the gestures inputted on the touch screen. The various modules constituting the wearable device of the current embodiment execute the corresponding steps of the method embodiment shown in FIG. 1. The relevant description of the various steps of the method embodiment as shown in FIG. 1 can be referenced for more details. The wearable device according to the current embodiment includes an acquisition module 310, a computation module 320 and a grouping module 330.

The acquisition module 310 may acquire the position information of the current wearable device and of the nearby wearable devices. For example, the acquisition module 310 may acquire the position information of the current wearable device and of the nearby wearable devices that are provided by the positioning of the global positioning system (GPS), or by receiving the wireless signals transmitted from the surrounding wearable devices and further measuring the corresponding signal strength values of these wireless signals. The acquisition module 310 may then convey all the position information to the computation module 320.

The computation module 320 may receive the position information sent from acquisition module 310, and then calculate the distances of each nearby wearable device from the current wearable device based on the received position information. For example, the computation module 320 may receive the position information of the current wearable device and of the nearby wearable devices, and calculate the distances of the nearby wearable devices from the current wearable device based on the GPS position information or the signal strength values. The computation module may convey the distances information of the nearby wearable devices from the current wearable device to the grouping module 330.

The grouping module 330 may receive the distances sent from the computation module 320, sort out all the nearby wearable devices that satisfy the preset distance requirements, and build up communication connections with them, and thus create a communication group. All the members within the communication group can communicate with each other.

Advantages of the disclosure may follow: differing from the prior art, the current wearable device acquires the position information of itself and of the nearby wearable devices, calculates the distances of these nearby wearable devices from the current wearable device based on the position information, and builds up communication connections with the nearby wearable devices that satisfy the preset distance requirements, thus a communication group can be automatically created among them, such that the user of the current wearable device can expand his friendship circle.

Figure 4:
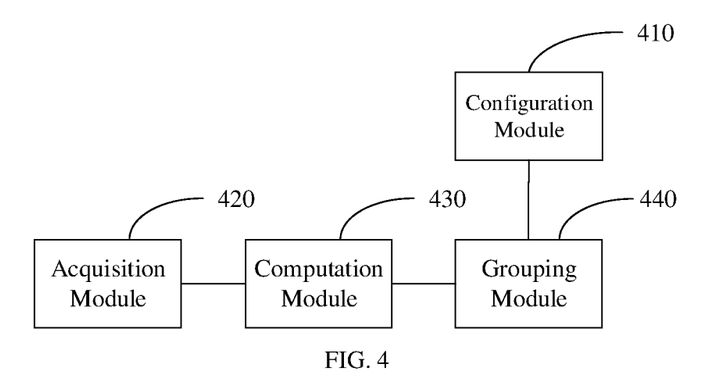
FIG. 4 is a block diagram illustrating a wearable device which can create a communication group with other such wearable devices according to another embodiment of the disclosure.

Referring now to FIG. 4, a block diagram illustrating a wearable device which can create a communication group with other such wearable devices according to another embodiment of the disclosure is shown. The wearable devices can be, for example, but not limited to, smartwatches. Every wearable device may have a touch screen, and can recognize the gestures inputted on the touch screen. The various modules constituting the wearable device of the current embodiment execute the corresponding steps of the method embodiment shown in FIG. 2. The relevant description of the various steps involved in the method embodiment shown in FIG. 2 can be referenced for more details. The wearable device according to the current embodiment includes a configuration module 410, an acquisition module 420, a computation module 430 and a grouping module 440.

The configuration module 410 may receive the setting information entered by the user-including the hobby settings. The configuration module 410 may then send the setting information to the grouping module 440.

The acquisition module 420 may obtain the position information of the current wearable device and of the nearby wearable devices that is provided by global positioning system (GPS) positioning, or by receiving the wireless signals emitted from the nearby wearable devices and further measuring the signal strength values corresponding to these wireless signals. The acquisition module 420 may then send the acquired GPS position information of the current wearable device and of the nearby wearable devices or the signal strength values to the computation module 430.

The computation module 430 may receive from the acquisition module the GPS position information of the current wearable device and of the nearby wearable devices, or the signal strength values, and calculate the distances of these nearby wearable devices from the current wearable device based on the position information or the signal strength values. Specifically, the computation module 430 may directly calculate the distances based on the GPS position information of the current wearable device and of the nearby wearable devices, or it may calculate the distances based on the received signal strength values. The computation module 430 may convey the distances information of the nearby wearable devices from the current wearable device to the grouping module 440.

The grouping module 440 may receive the setting information sent from the configuration module 410 and the distances information sent from the computation module 430, sort out all the nearby wearable devices that satisfy the preset distance requirements and share common hobby settings, found in the setting information, as the current wearable device, and build up communication connections with them, and thus create a communication group. All the members within the communication group can communicate with each other.

For example, the grouping module 440 may receive the setting information sent from the configuration module 410 and the distances information sent from the computation module 430, sort out all the nearby wearable devices that satisfy the preset distance requirements and share common hobby settings, found in the setting information, as the current wearable device, and build up communication connections with them, and thus create a communication group. All the members within the communication group can communicate with each other.

Advantages of the disclosure may follow: differing from the prior art, the current wearable device acquires the position information of itself and of the nearby wearable devices, calculates the distances of these nearby wearable devices from the current wearable device based on the position information, and builds up communication connections with the nearby wearable devices that satisfy the preset distance requirements and share common hobby settings as the current wearable device, thus a communication group is automatically created among them, such that the user of the current wearable device can expand his friendship circle, and can communicate with the other users who share common hobbies as him.

Furthermore, it is apparent to those skilled in the art that, the present disclosure also provides a wearable device which can create a communication group with other such wearable devices in the vicinity, the wearable device comprising a non-transitory program storage medium and a processor. The non-transitory program storage medium stores a program executed by the processor to perform the methods as described in above. Furthermore, it is apparent to those skilled in the art that, various units or modules 310, 320, 330, 410, 420, 430 and 440 as shown in FIG. 3 or FIG. 4 are software modules or software units. In another aspect, it is well-known that various software modules or software units inherently are stored in the non-transitory program storage medium and executed by the processor.

In the above description, numerous specific details are set forth for purposes of illustration but not of limitation, such as system architectures, interfaces and relevant technologies, etc. However, it should be appreciated by those of skill in the art that, in absence of these specific details, the disclosure may also be achieved by other implementations. In other instances, a detailed description for well-known devices, circuits and methods is omitted, in order to avoid unnecessary details from hindering the description of the present disclosure.

The invention claimed is:

1. A method of creating a communication group based on wearable devices, comprising:

acquiring, by a current wearable device, position information of the current wearable device and of at least one wearable device in the vicinity of the current wearable device;

calculating, by the current wearable device, distances of the at least one wearable device in the vicinity of the current wearable device from the current wearable device based on the position information; and building up, by the current wearable device, communication connections with the at least one wearable device in the vicinity of the current wearable device that satisfies preset distance requirements, to create the communication group;

wherein acquiring, by the current wearable device, the position information of the current wearable device and of the at least one wearable device in the vicinity of the current wearable device comprises: receiving wireless signals emitted from the at least one wearable device in the vicinity of the current wearable device and further measuring corresponding signal strength values of these wireless signals emitted from the at least one wearable device in the vicinity of the current wearable device; and wherein calculating, by the current wearable device, distances of the at least one wearable device in the vicinity of the current wearable device from the current wearable device comprises: retrieving the corresponding distances of at least one wearable device in the vicinity of the current wearable device from the current wearable device by referring to a lookup table, which comprises a plurality of signal strength value ranges and a plurality of distances, each signal strength value range corresponding to exactly one distance, and each distance corresponding to exactly one signal strength value.

2. The method according to claim 1, further comprising, before acquiring, by the current wearable device, the position information of the current wearable device and of the at least one wearable device in the vicinity of the current wearable device: receiving setting information entered by a user, wherein the setting information comprises hobby settings.

3. The method according to claim 2, wherein building up, by the current wearable device, the communication connections with the at least one wearable device in the vicinity of the current wearable device that satisfy the preset distance requirements in order to establish the communication group comprises: building up, by the current wearable device, the communication connections with the at least one wearable device in the vicinity of the current wearable device that satisfy preset distance requirements and share common hobby settings as the current wearable device, and thus creating the communication group.

4. The method according to claim 1, further comprising, before acquiring, by the current wearable device, the position information of the current wearable device and of the at least one wearable device in the vicinity of the current wearable device: receiving setting information entered by a user, wherein the setting information comprises hobby settings.

5. The method according to claim 1, further comprising, before acquiring, by the current wearable device, the position information of the current wearable device and of the at least one wearable device in the vicinity of the current wearable device: receiving setting information entered by a user, wherein the setting information comprises hobby settings.

6. The method according to claim 1, wherein the preset distance requirements comprise that the distance of the at least one wearable device in the vicinity of the current wearable device from the current wearable device is smaller than a preset threshold value or is within a preset value range.

7. The method according to claim 6, wherein when the distance of the at least one wearable device, which is in the vicinity of the current wearable device and has joined the communication group, is larger than the preset threshold value or exceeds the preset value range, the at least one wearable device in the vicinity of the current wearable device is automatically withdrawn from the communication group, and information related to the at least one wearable device is deleted from the communication group.

8. A wearable device having a capability of creating a communication group with at least one other wearable device in a vicinity of the wearable device, comprising a processor and a non-transitory program storage medium, where the non-transitory program storage medium comprises an acquisition module, a computation module and a grouping module; wherein
the acquisition module is configured to obtain position information of the wearable device and of at least one wearable device in the vicinity of the wearable device;
the computation module is configured to calculate distances of the at least one wearable device in the vicinity of the wearable device from the wearable device based on the position information; and
the grouping module is configured to build up communication connections between the wearable device with the at least one wearable device in the vicinity of the wearable device that satisfy preset distance requirements, to create the communication group automatically, and the communication group is configured for users within the communication group to communicate with each other;
wherein the acquisition module is further configured to receive wireless signals emitted from the at least one wearable device in the vicinity of the wearable device and measure corresponding signal strength values of these wireless signals emitted from the at least one wearable device in the vicinity of the wearable device; and
the computation module is further configured to retrieve the corresponding distances of the at least one wearable device in the vicinity of the current wearable device from the current wearable device by referring to a lookup table, which comprises a plurality of signal strength value ranges and a plurality of distances, each signal strength value range corresponding to exactly one distance, and each distance corresponding to exactly one signal strength value.

9. The wearable device according to claim 8, further comprising a configuration module configured to receive setting information entered by a user, wherein the setting information comprises hobby settings.

10. The wearable device according to claim 9, wherein the grouping module is configured to specifically build up communication connections between the current wearable device and the at least one wearable device in the vicinity of the current wearable device that satisfy preset distance requirements and share common hobby settings, found in the setting information, as the wearable device, to establish the communication group.

11. The wearable device according to claim 8, further comprising a configuration module configured to receive setting information entered by a user, wherein the setting information comprises hobby settings.

* * * * *